(12) United States Patent
Uezaki et al.

(10) Patent No.: US 7,722,792 B2
(45) Date of Patent: May 25, 2010

(54) INJECTION MOLD AND PARTIAL COMPRESSION MOLDING METHOD

(75) Inventors: Teruaki Uezaki, Ryugasaki (JP); Takashi Arai, Ryugasaki (JP); Yoshihiro Iitsuka, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 12/022,387

(22) Filed: Jan. 30, 2008

(65) Prior Publication Data

US 2008/0185747 A1 Aug. 7, 2008

(30) Foreign Application Priority Data

Feb. 5, 2007 (JP) ............... 2007-025619
Jan. 22, 2008 (JP) ............... 2008-011625

(51) Int. Cl.
*B29C 45/56* (2006.01)

(52) U.S. Cl. .............. 264/328.7; 425/555; 425/556

(58) Field of Classification Search .............. 264/328.7, 264/328.11, 328.12; 425/555, 556
See application file for complete search history.

(56) References Cited

U.S. PATENT DOCUMENTS

| | | | |
|---|---|---|---|
| 5,340,528 A | | 8/1994 | Machida et al. |
| 5,667,868 A | * | 9/1997 | Freeman .................... 428/120 |
| 7,083,403 B2 | | 8/2006 | Arai .................... 425/4 |
| 7,094,376 B2 | * | 8/2006 | Schmidt .................... 264/328.8 |
| 7,114,946 B2 | | 10/2006 | Mizuta et al. ............... 425/542 |
| 2007/0003659 A1 | * | 1/2007 | Lee et al. .................... 425/556 |

FOREIGN PATENT DOCUMENTS

| | | | |
|---|---|---|---|
| EP | 662383 | * | 7/1995 |
| JP | 63-209915 | * | 8/1988 |
| JP | 5-228970 | | 9/1993 |
| JP | 6-87143 | * | 3/1994 |
| JP | 7-148562 | | 6/1995 |
| JP | 11-198198 | | 7/1999 |
| JP | 2002-283422 | | 10/2002 |

OTHER PUBLICATIONS

Chinese Office Action dated Sep. 18, 2009, in related corresponding Chinese Patent Appln. No. 200810004842.9 (with English translation).

* cited by examiner

*Primary Examiner*—Jill L Heitbrink
(74) *Attorney, Agent, or Firm*—Fitzpatrick, Cella, Harper & Scinto

(57) ABSTRACT

In an injection mold, a compression pin is placed at a cavity surface by the pressing force of a biasing member, and is moved rearward by the pressure of filled resin so as to form a compression boss. After the completion of filling, the compression boss is compressed by the compression pin.

6 Claims, 9 Drawing Sheets

INJECTION MOLD AND PARTIAL COMPRESSION MOLDING METHOD

BACKGROUND OF THE INVENTION

1. Field of the Invention

The present invention relates to an injection mold used to form a resin molded item, and a partial compression method for the injection mold.

2. Description of the Related Art

In a mold for partial compression molding disclosed in Japanese Patent Laid-Open No. 5-228970, depressions are formed by moving ejector pins back away from a mold surface, which forms an inner surface of a molded item, by a compression allowance. The depressions and a cavity are filled with resin in this state, and the resin is then compressed by the ejector pins. Japanese Patent Laid-Open No. 11-198198 discloses that the leading end of a boss is compressed by an ejector pin and that a peripheral portion of the boss is compressed by a sleeve pin. Further, Japanese Patent Laid-Open No. 2002-283422 discloses that an inner portion of a boss is compressed.

A known partial compression molding method will be described below with reference to FIGS. 7, 8, and 9.

In an injection compression mold shown in FIG. 7, a cavity 1 is defined by a cavity mold section 6 and a core mold section 7. The leading end of each ejector pin 17 is held at a position shifted rearward from a mold surface, which forms an inner surface of the cavity 1, so as to form a depression corresponding to a compression boss 4 which is a boss for compression (hereinafter a boss for compression will be referred to as a compression boss). A compression mechanism is provided in a movable clamping plate 10. The compression mechanism includes a plurality of hydraulic chambers 18 and hydraulic cylinders 19 to be hydraulically driven in the hydraulic chambers 18. The hydraulic cylinders 19 are disposed on a rear surface of an ejector plate 9 that is connected to the ejector pins 17. In order to mold an item with the mold having the above-described configuration, filling of molten resin is started in a state in which the ejector pins 17 are shifted rearward from a core surface by the distance corresponding to the compression bosses 4, and the interiors of the cavity 1 and the compression bosses 4 are filled with the resin. After resin filling is completed, the compression mechanism is started so that the ejector plate 9, that is, the leading ends of the ejector pins 17 are pushed toward the cavity 1 (to the right in the figure) by the hydraulic cylinders 19, thus compressing the compression bosses 4. By this compression, the pressure is substantially uniformly transmitted to the entire mold. This can remove a sink mark from a rib. In order to prevent a sink mark from being formed on the rear side of the boss, the leading end of a boss portion 20 can be compressed by a sleeve pin 21 slid by a hydraulic cylinder 19, as shown in FIG. 8, or an inner pin 22 that forms a depression in a boss portion 20 can be compressed by a hydraulic cylinder 19, as shown in FIG. 9.

As described above, the ejector pin retreats by the compression allowance before resin filling, and a compression boss formed during resin filling is compressed, so that a sink mark can be prevented from being formed on the rear side of a boss or a rib.

Unfortunately, in the above-described known methods, since the resin flows to the compression boss during resin filling, the resin flow undulates at the leading end on the surface of the cavity, and nonuniform flow easily occurs. When the resin flows to the compression boss, the pressure of resin in the cavity of the compression boss decreases, and the cavity surface of the rear side of the compression boss and a portion downstream of the compression boss become regions having low transferability because of insufficient resin filling. Consequently, an appearance defect, such as nonuniform transfer and uneven glossiness, is sometimes caused. Further, since there is a pressure difference in the cavity after resin filling, when the compression boss is compressed by the ejector pin, the compression pressure varies in accordance with the position of the ejector pin, and it is difficult to apply a sufficient compression pressure to necessary portions. Moreover, since compression needs to be performed with the hydraulic cylinder, the mold structure is complicated and the cost is increased.

SUMMARY OF THE INVENTION

The present invention provides an injection mold and an injection molding method that obtain a molded item having superior appearance by preventing a sink mark from being formed on the back of a rib or a boss of the molded item.

An injection mold according to an aspect of the present invention includes a stationary mold section; a movable mold section that forms a cavity between the movable mold section and the stationary mold section; a compression pin extending through the movable mold section and having a front end face that forms a part of a cavity surface; a biasing member provided in the compression pin so that the front end face of the compression pin is caused to retreat from the cavity by the pressure of resin; and a driving unit configured to advance the retreating front end face of the compression pin toward the cavity.

A partial compression molding method according to another aspect of the present invention includes the steps of forming a surface of a cavity by a stationary mold section, a movable mold section, and a front end face of a compression pin; filling the cavity with molten resin; forming a compression boss by causing the front end face of the compression pin to retreat from the cavity surface by the pressure of the filled resin; and moving the resin in the compression boss into the cavity by advancing the compression pin toward the cavity after filling of the resin is completed.

According to the present invention, since a compression boss is not formed at the start of resin filling and resin flows along the cavity, nonuniform flow can be avoided. Further, since a compression boss is automatically formed by the pressure of resin, a complicated driving source, such as a hydraulic cylinder or an air cylinder, is unnecessary. This can simplify the mold structure and can reduce the mold cost. In addition, a sink mark is prevented from being formed on an outer surface of a rib or a boss by partially compressing the compression boss, and nonuniform transfer and uneven glossiness can be prevented from being caused by formation of the compression boss.

Further features of the present invention will become apparent from the following description of exemplary embodiments with reference to the attached drawings.

DESCRIPTION OF THE EMBODIMENTS

Figure 1:
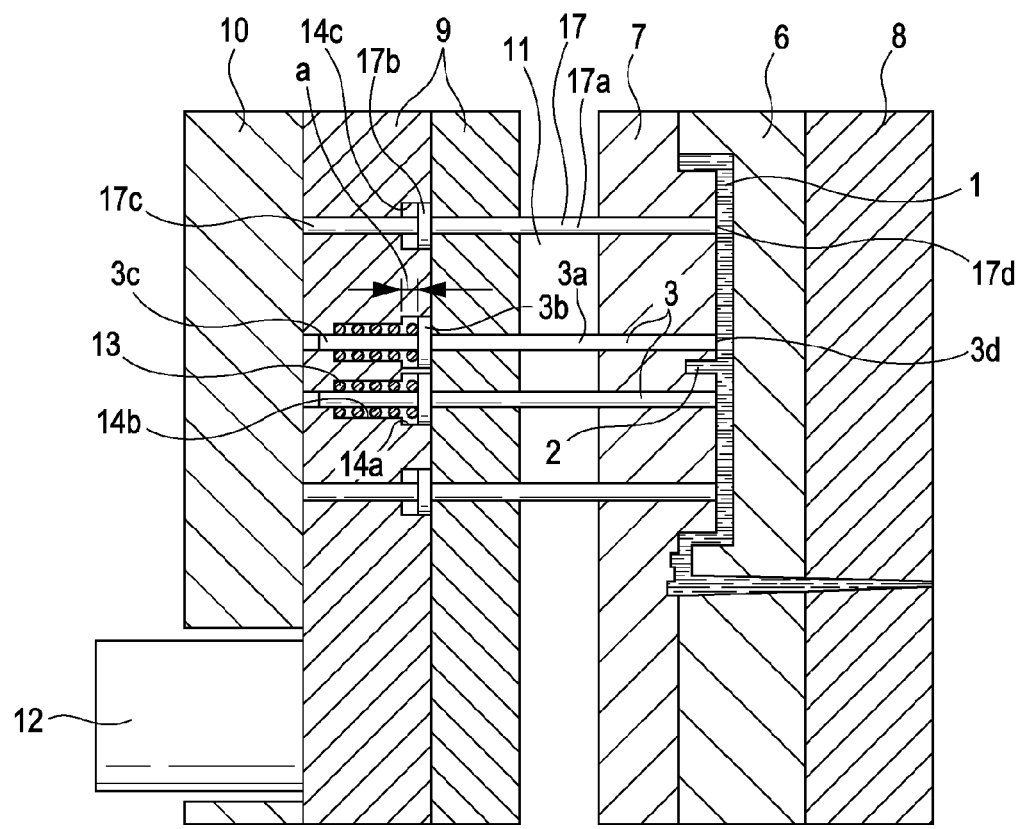
FIG. 1 is a cross-sectional view of the principal part of an injection mold before injection according to an exemplary embodiment of the present invention.

An exemplary embodiment of the present invention will be described with reference to the drawings. FIG. 1 is a cross-sectional view showing the principal part of an injection mold according to the exemplary embodiment. Referring to FIG. 1, a stationary mold section 6 is fixed to a stationary clamping plate 8. A movable mold section 7 is attached to and held by a movable clamping plate 10 with a spacer block (not shown) disposed therebetween. A cavity 1 is defined between the stationary mold section 6 and the movable mold section 7. Further, a space 11 is formed between the movable mold section 7 and the movable clamping plate 10 by the spacer block. In the space 11, a pair of ejector plates 9 are provided so as to be pushed toward the cavity 1 by an ejector rod 12 that is driven by an ejector cylinder (not shown). Compression pins 3 extend through the ejector plates 9. Each compression pin 3 includes a front end portion 3a, a flange portion 3b, and a rear end portion 3c. A biasing member 13 is provided on the outer periphery of the rear end portion 3c of each compression pin 3, and pushes and presses the flange portion 3b toward the cavity 1. Front end faces 3d of the compression pins 3 form parts of a cavity surface of the movable mold section 7 facing the cavity 1 until the pressure of resin filled in the cavity 1 is increased to a predetermined pressure by the biasing members 13. When the pressure of the filled resin reaches the predetermined pressure, the front end faces 3d of the compression pins 3 retreat from the cavity surface. The predetermined pressure does not need to be high, and can be set at, for example, at least one newton. If the predetermined pressure is set at a high pressure, it is difficult to form a depression 2 that will be described below. Therefore, the predetermined pressure is also set at about seven newtons or less. However, the predetermined pressure is not limited to the above-described range as long as it allows formation of the depression 2 during resin filling. At the cavity 1, a depression 2 is provided to form a rib (projection) in a molded item. The front end faces 3d of the compression pins 3 are disposed around the depression 2. At the depression 2, nonuniform transfer, such as a sink mark, easily occurs during molding. The front end faces 3d of the compression pins 3 are disposed near a portion where nonuniform transfer, such as a sink mark, easily occurs during molding. While the biasing members 13 are formed by springs in this exemplary embodiment, they may be formed, for example, by elastic members made of urethane rubber. Large-diameter openings 14a are provided between the ejector plates 9, and store the flange portions 3b of the compression pins 3. The large-diameter openings 14a are formed with a play such that the flange portions 3b can retreat by a movable stroke "a". Therefore, the compression pins 3 can retreat by the movable stroke "a" and move within the movable stroke "a" in the large-diameter openings 14a. Further, medium-diameter openings 14b are provided between the ejector plates 9. The medium-diameter openings 14b have a diameter smaller than the diameter of the large-diameter openings 14a, and store the springs 13.

Ejector pins 17 extend through the ejector plates 9. The ejector pins 17 each include a front end portion 17a, a flange portion 17b, and a rear end portion 17c. Front end faces 17d of the ejector pins 17 form parts of the above-described cavity surface of the movable mold section 7. Large-diameter openings 14c are also provided between the ejector plates 9, and store the flange portions 17b of the ejector pins 17. The large-diameter openings 14c are formed with a play such that the flange portions 17b can retreat by the movable stroke "a". Therefore, the ejector pins 17 can retreat by the movable stroke "a" and move within the movable stroke "a" in the large-diameter opening 14c.

A description will now be given of a partial compression molding method that molds an item by using the injection mold having the above-described configuration, with reference to FIGS. 1 to 6.

First, the stationary mold section 6 and the movable mold section 7 are clamped to form the cavity 1. Then, molten resin is injected from an injection nozzle (not shown) into the cavity 1 so that the cavity 1 is filled with the resin. In this case, the compression pins 3 are pressed by the biasing members 13 to form parts of the cavity surface of the movable mold section 7 in the cavity 1. Therefore, a compression boss is not formed at the beginning of a filling process. For this reason, the resin flows along the cavity shape even at the compression pins 3, and nonuniform flow does not occur. This state is shown in FIG. 1.

Figure 2:
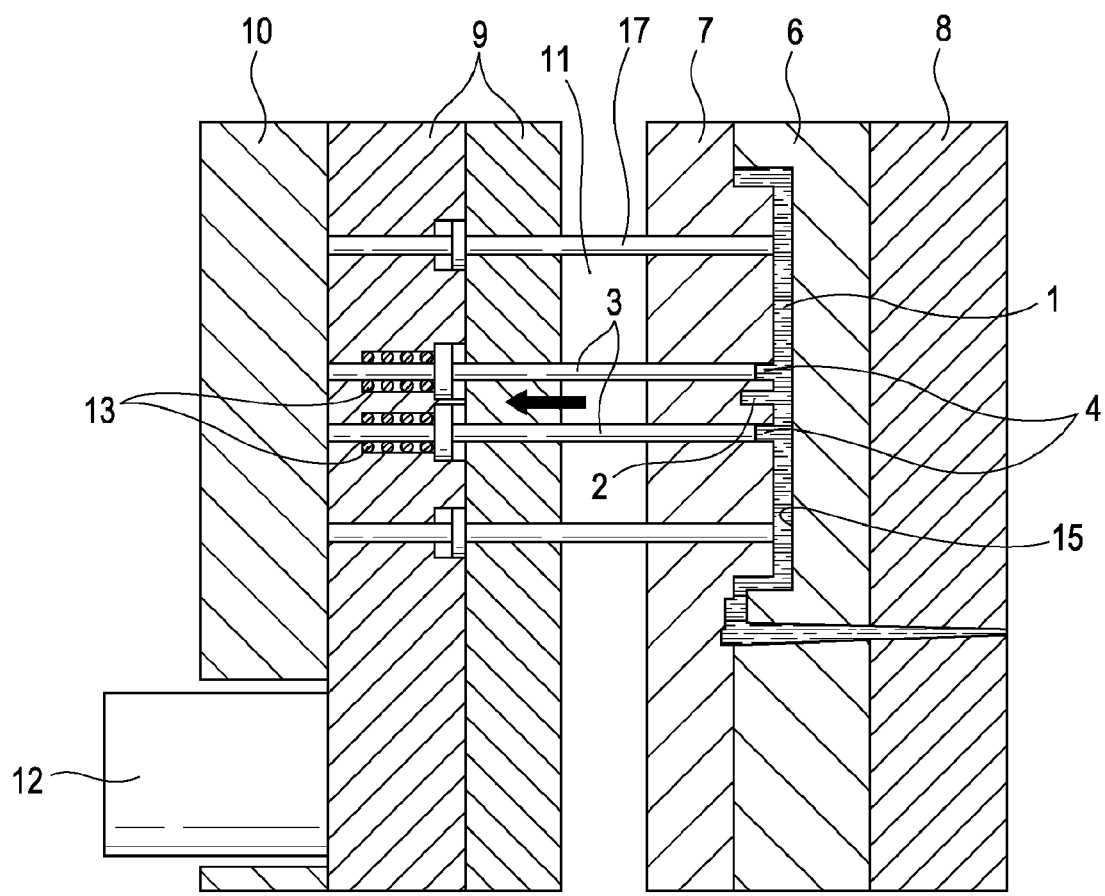
FIG. 2 is a cross-sectional view of the principal part of the injection mold after compression bosses are formed during injection.

As filling proceeds, the pressure of the resin in the cavity 1 increases. At the time when the pressure of resin exceeds the pressing force of the biasing members 13, the compression pins 3 are automatically pushed back by the compression stroke "a", so that compression bosses 4 are formed. This state is shown in FIG. 2. Since a skin layer has been formed on a cavity surface 15 of the stationary mold section 6 by cooling and solidification before the compression bosses 4 are formed, uniform transferability is ensured over the entire cavity surface 15 without any influence of formation of the compression bosses 4.

Figure 3:
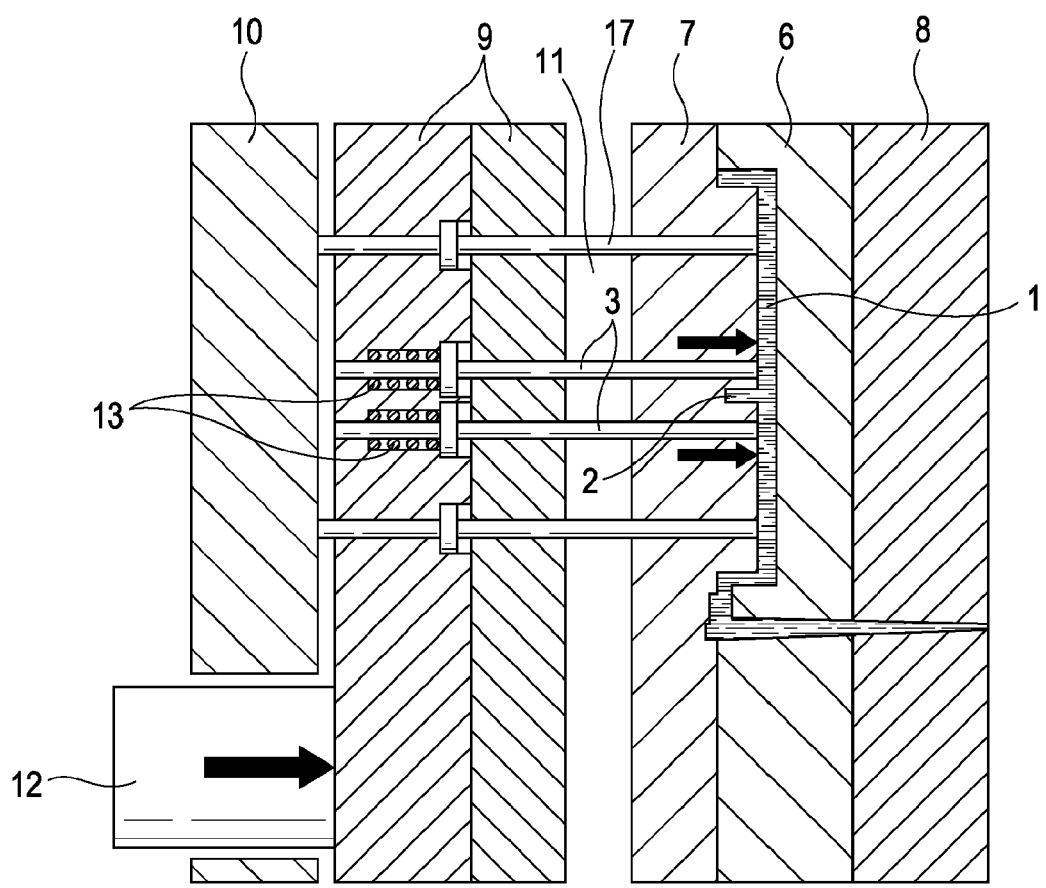
FIG. 3 is a cross-sectional view of the principal part of the injection mold after the compression bosses are compressed by compression pins.

After filling of the molten resin is completed, before mold opening is performed, and before the resin is completely cooled and solidified, the ejector rod 12 is moved forward (to the right in the figure) by a predetermined distance by driving the ejector cylinder (not shown). The compression pins 3 advance (to the right in the figure) in conjunction with the ejector plates 9, thereby compressing the compression bosses 4. This state is shown in FIG. 3. In this exemplary embodiment, the predetermined distance is set to be equal to the compression stroke "a". The compression pins 3 are advanced toward the cavity 1 by the same distance as they are pushed back, and the resin in the compression bosses 4 is moved to the cavity 1 so that the compression bosses 4 are not left in the molded item. Alternatively, the predetermined distance may be set to be shorter than the movable stroke "a" so that the compression bosses 4 are left in the molded item. Movement of the resin in the compression bosses 4 prevents a sink mark from being formed on the cavity surface (back surface) opposite the depression 2. The large-diameter openings 14c in which the flange portions 17b of the ejector pins 17 are stored are formed with a play such that the flange portions 17b can retreat by the movable stroke "a". Even when the ejector plates 9 advance by the movable stroke "a", the ejector pins 17 do not advance toward the cavity 1. Therefore, there is no influence on the shape of the molded item.

Figure 5:
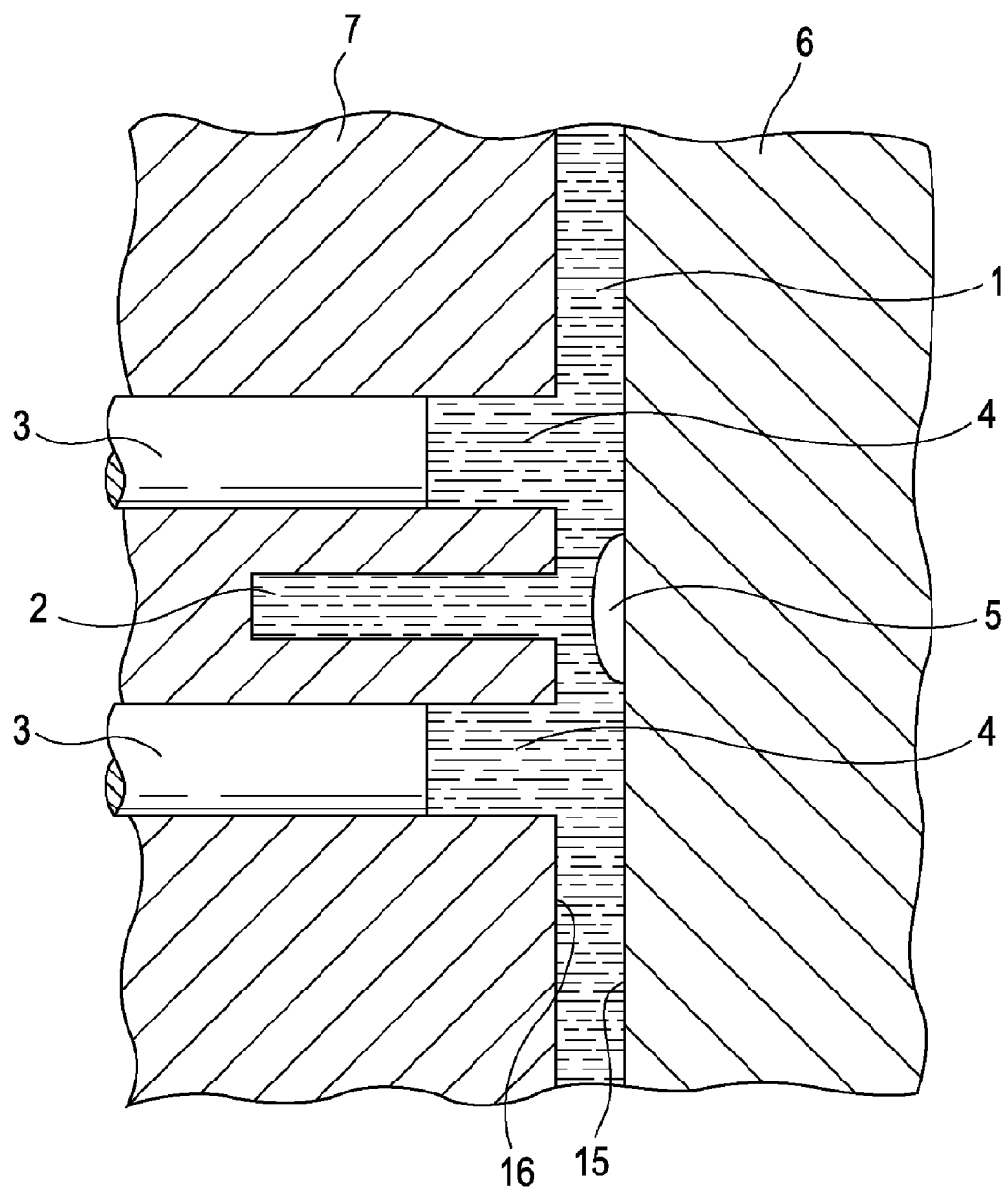
FIG. 5 is a cross-sectional view of a portion of the injection mold near a rib of a cavity.

FIG. 5 shows a state after the compression bosses 4 are formed and before the compression pins 3 advance. By shrinkage of resin due to cooling, a sink mark 5 is formed on the cavity surface of the back side of the depression 2 (side of the stationary mold section 6). By advancing the compression pins 3, the resin in the compression bosses 4 moves into the sink mark 5, and this can make up for the shortage of resin in the sink mark 5. Since the front end faces 3a of the compression pins 3 are disposed near the depression 2, the resin in the compression bosses 4 easily flows into the sink mark 5. Therefore, the above-described effect is achieved remarkably.

Figure 6:
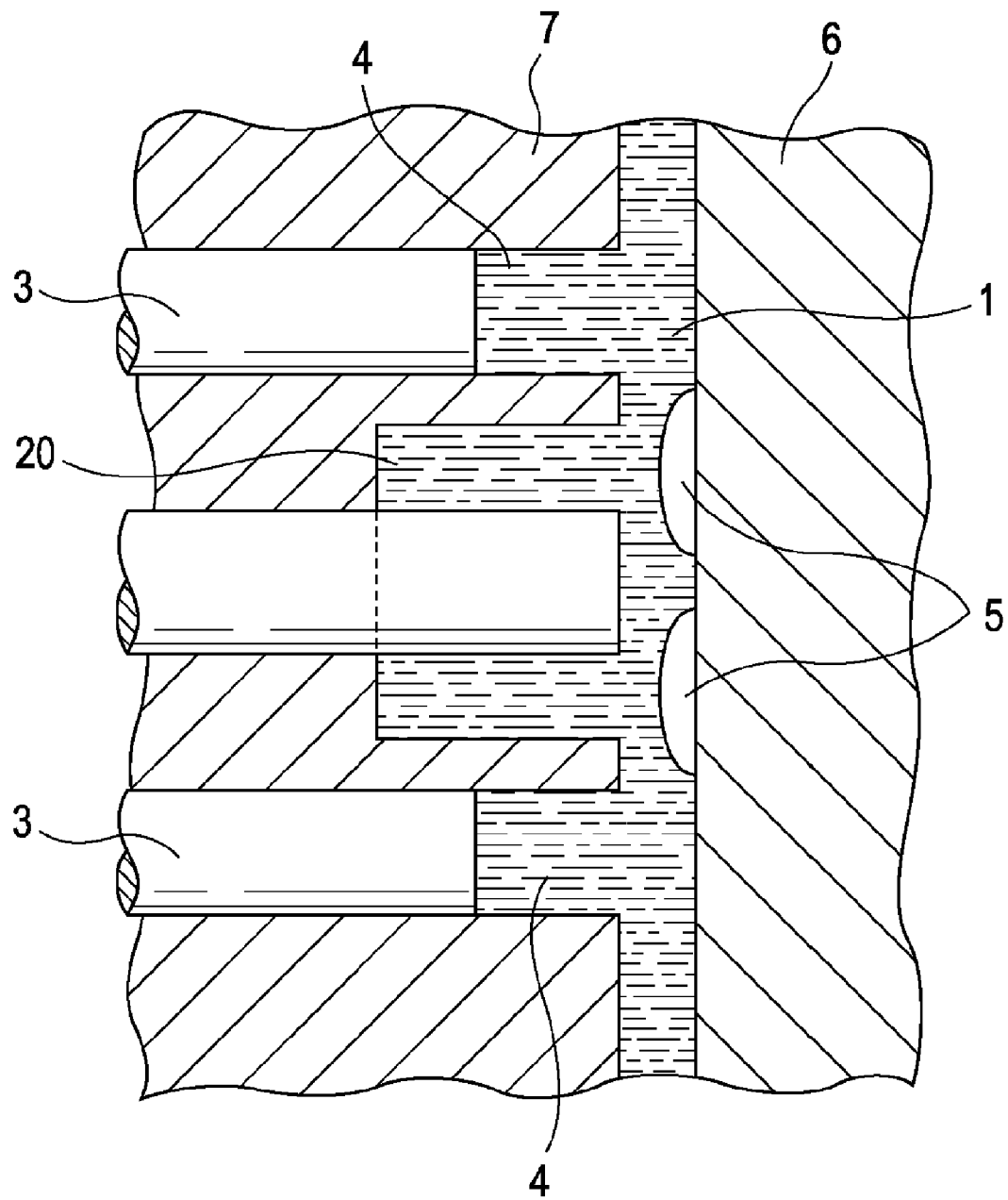
FIG. 6 is a cross-sectional view of a portion of the injection mold near a boss of a cavity.
Figure 7:
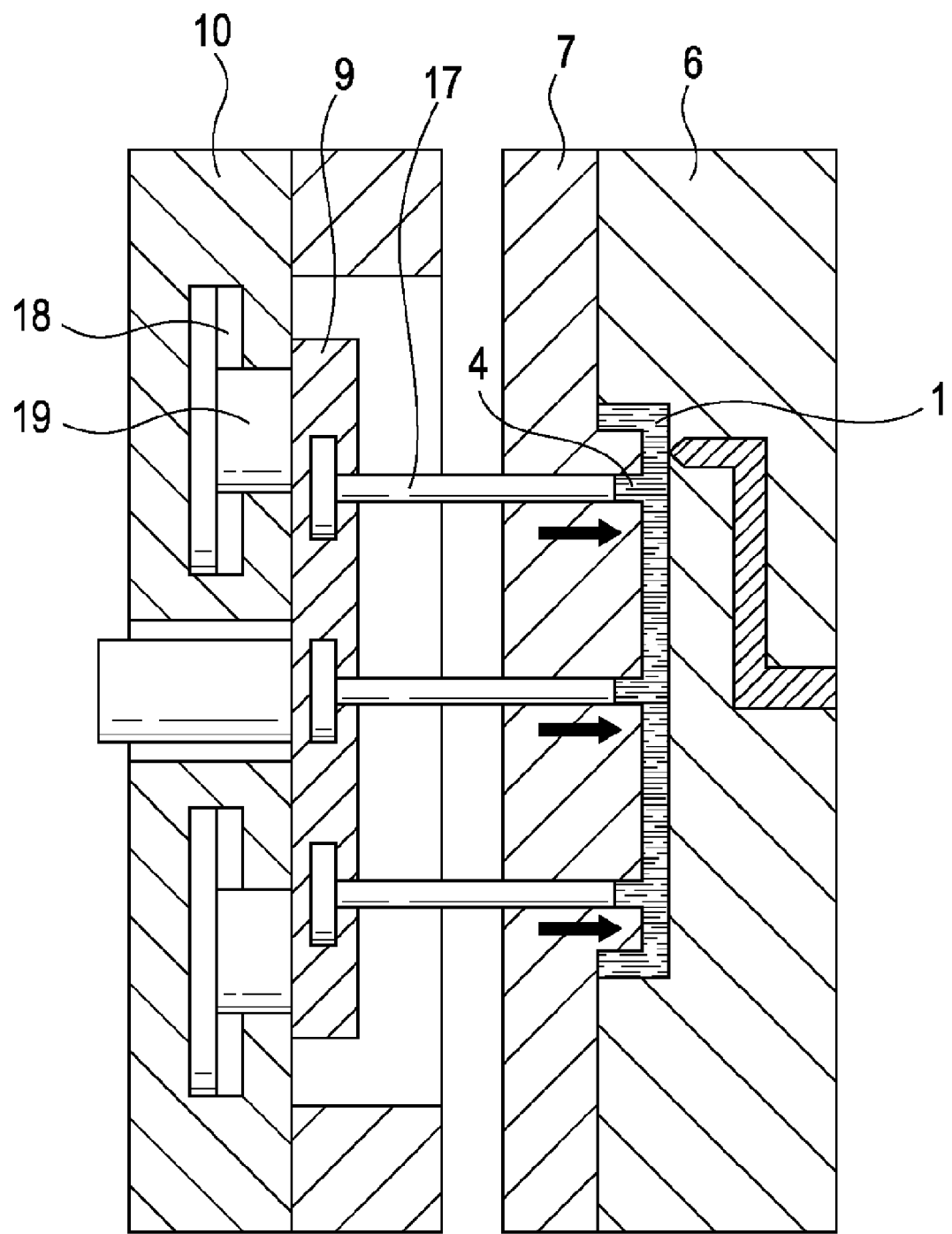
FIG. 7 is a cross-sectional view of the principal part of a known injection compression mold before compression molding.
Figure 8:
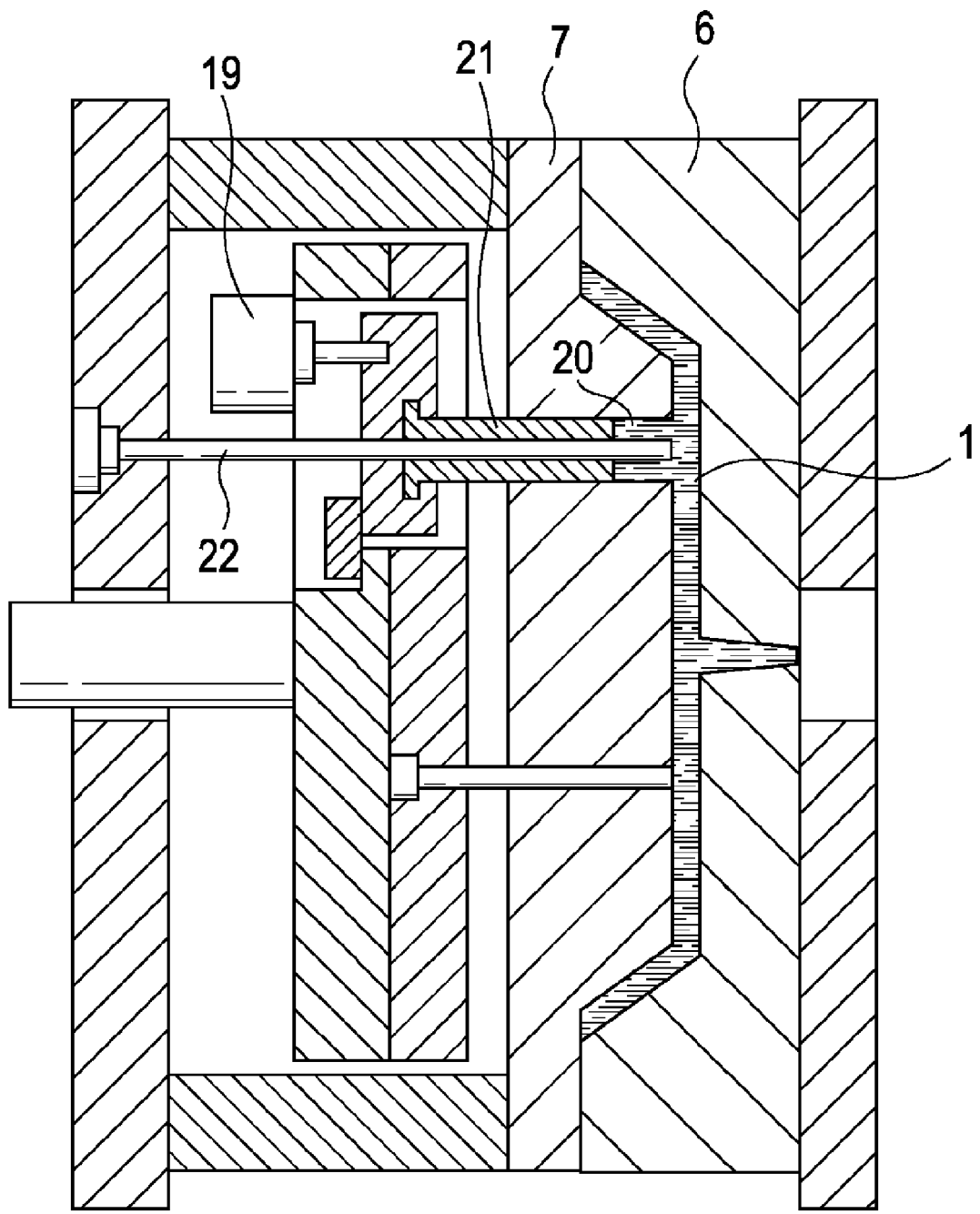
FIG. 8 is a cross-sectional view of the principal part of a known mold for compressing the leading end of a cylindrical boss.
Figure 9:
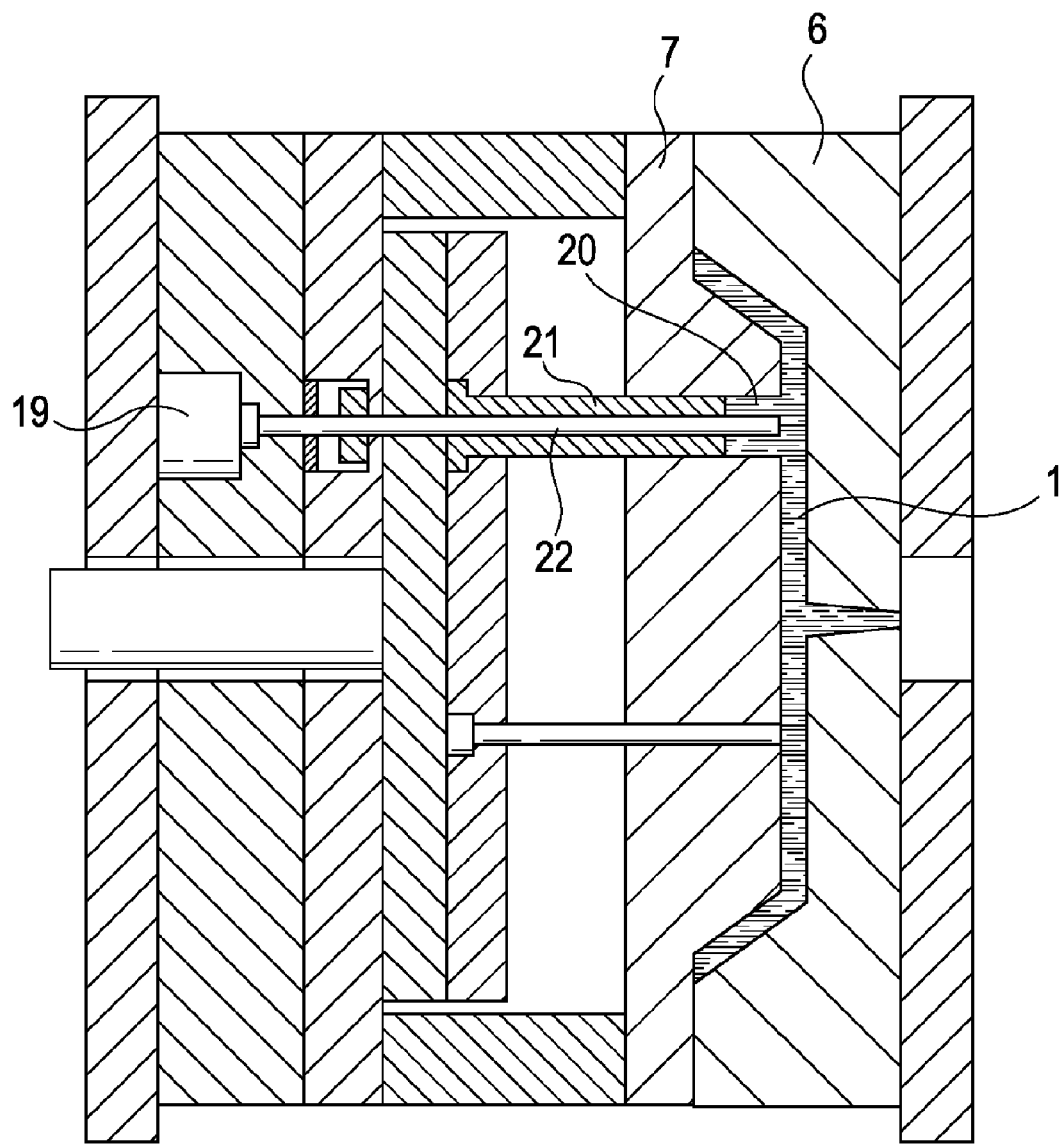
FIG. 9 is a cross-sectional view of the principal part of a known mold for compressing a depressed portion of a cylindrical boss.

FIG. 6 shows the surroundings of a boss portion 20 in an another exemplary embodiment of the present invention. In this exemplary embodiment, the boss portion 20 is provided instead of the depression 2. The boss portion 20 is disposed in a cavity 1 so as to form a boss in an item molded in the cavity 1. Sink marks 5 are formed on a cavity surface opposite the boss portion 20 (on the side of a stationary mold section 6) by shrinkage of resin due to cooling. By advancing compression pins 3, resin in the compression bosses 4 flows into the sink marks 5, and this can make up for the shortage of resin in the sink marks 5. Since front end faces of the compression pins 3 are disposed near the boss portion 20, the resin in the compression bosses 4 easily flows into the sink marks 5. Therefore, the above-described effect is achieved remarkably.

Figure 4:
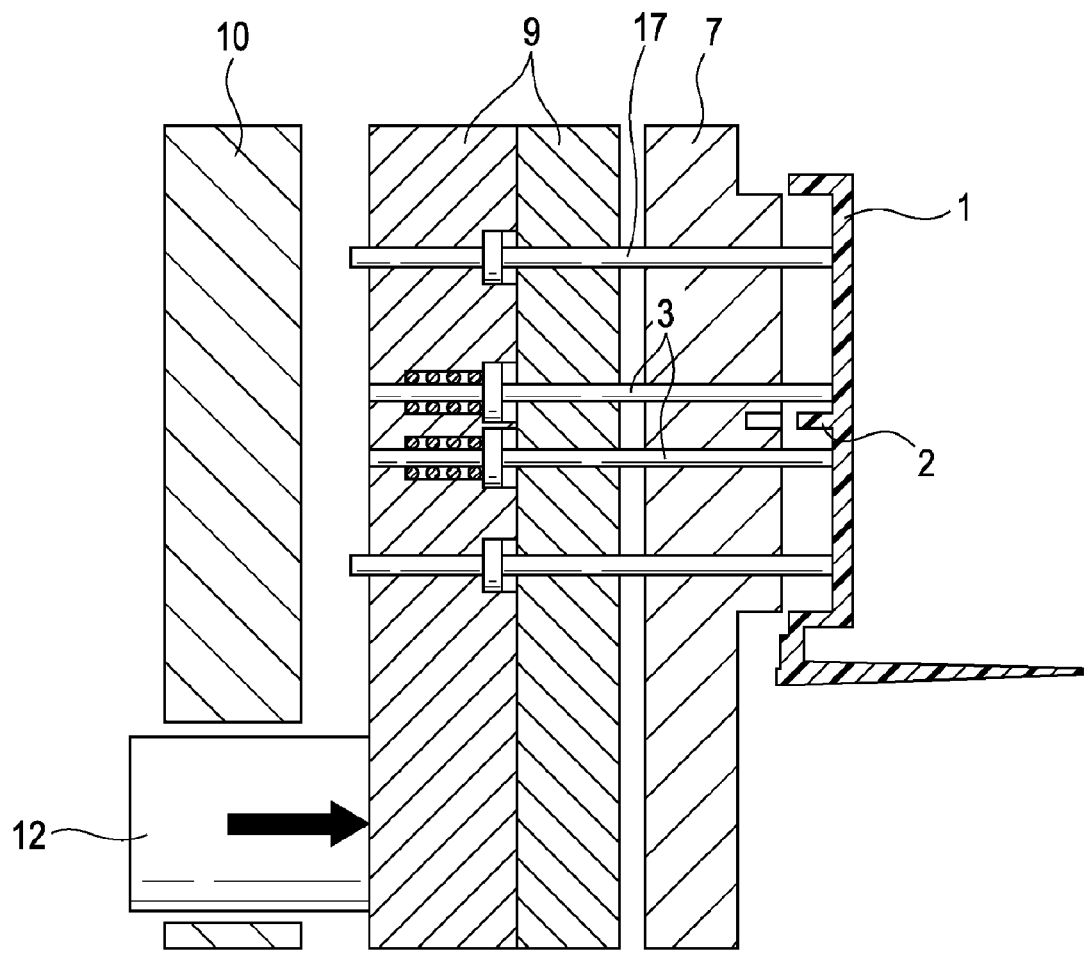
FIG. 4 is a cross-sectional view of the principal part of the injection mold when a molded article is released.

After the resin is completely solidified by cooling and after mold opening is performed, an ejector rod 12 is further moved forward (to the right in the figure), as shown in FIG. 4, so as to release the cavity 1 from a movable mold section 7 by the compression pins 3 in cooperation with ejector pins 17 operatively connected to ejector plates 9.

As described above, in the exemplary embodiments of the present invention, compression bosses are not formed at the start of resin filling, and resin flows along the cavity. Therefore, nonuniform flow is avoided. Further, since compression bosses are automatically formed by the pressure of resin, a complicated driving source, such as a hydraulic cylinder or an air cylinder, is unnecessary. This can simplify the mold structure, and can reduce the mold cost. In addition, by partially compressing the compression bosses, a sink mark is prevented from being formed on an outer surface of a rib or a boss, and nonuniform transfer and uneven glossiness due to formation of the compression bosses are avoided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-025619 filed Feb. 5, 2007 and No. 2008-011625 filed Jan. 22, 2008, which are hereby incorporated by reference herein in their entirety.

What is claimed is:

1. An injection mold comprising:
   a stationary mold section;
   a movable mold section disposed opposite to the stationary mold section, with a cavity formed between the movable mold section and the stationary mold section;
   a compression pin extending through the movable mold section and having a front end face that forms a part of a cavity surface;
   a biasing member providing a biasing force against the compression pin, wherein the front end face of the compression pin can retreat from the cavity by pressure of resin filling the cavity and forming a compression boss; and
   a driving unit configured to advance the retreating front end face of the compression pin toward the cavity to compress the formed compression boss before cavity opening, with the driving unit independent from the biasing member.

2. The injection mold according to claim 1, further comprising:
   an ejector pin and an ejector plate configured to push out an article molded in the cavity.

3. The injection mold according to claim 2, wherein the compression pin has a flange portion, and the flange portion is movably stored in a large-diameter opening provided in the ejector plate.

4. The injection mold according to claim 3, wherein the front end face of the compression pin is pushed toward the cavity by biasing the flange portion by the biasing member.

5. The injection mold according to claim 1, wherein the biasing member includes a spring or an elastic member.

6. A partial compression molding method comprising the steps of:
   forming a surface of a cavity by a stationary mold section, a movable mold section, and a front end face of a compression pin;
   filling the cavity with molten resin;
   forming a compression boss by causing the front end face of the compression pin to retreat, against a biasing member, from the cavity surface by the pressure of the filled resin; and
   compressing the compression boss by advancing the compression pin toward the cavity with a driving unit after filling of the resin is completed and before cavity opening, wherein the driving unit is independent from the biasing member.

* * * * *